July 3, 1928.
B. SPINELLI
PRICE INDICATOR
Filed May 2, 1927
1,676,060
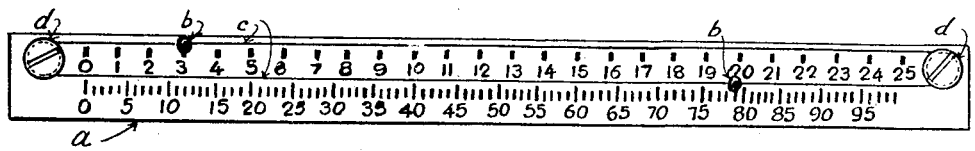
Benjamin Spinelli
INVENTOR Patented July 3, 1928.

1,676,060

UNITED STATES PATENT OFFICE.

BENJAMIN SPINELLI, OF PHILADELPHIA, PENNSYLVANIA.

PRICE INDICATOR.

Application filed May 2, 1927. Serial No. 188,256.

My invention relates to an improved device for showing the price of an article of merchandise.

The object of my improvement is to show the price of an article of merchandise on display, without the use of a price card specially made for an article of a given price, and useless for any other price.

This object is attained by the device illustrated in the accompanying drawing.

It consists of a scale with numbered divisions intended to indicate dollars and cents; wires stretched in front of said scale and carrying movable markers.

In the accompanying drawing: $a$, shows the scale; $b$, the markers; $c$, the wires, and $d$ the supports for the wires.

The markers, which may be stopped at any desired division, will indicate any price within the range of the scale, of an article of merchandise placed close to the indicator, as for example on a shelf having the indicator on its front edge.

I am fully aware of the fact that scales with numbered divisions are not a new invention, neither are movable markers, therefore I do not claim as my invention any of the above component parts.

What I do claim is:

1. A price indicator comprising a scale including one set of indications representing dollars and another set of indications representing cents, a supporting member at each end of the scale on the front face thereof, a wire mounted on the supports to provide two parallel strands, and a marker movably mounted on each wire strand for coaction with an adjacent set of indications.

2. A price indicator comprising, in combination, a scale having two sets of indications on the face thereof, supports located at the ends of the scale and projecting from the face thereof, a wire passing around said supports providing two parallel strands between them, and a single marker on each wire strand for coaction with a set of the scale indications.

3. A price indicator including a rectangular member providing a surface for the delineation of numerals representing monetary values, supports at the ends of said member, a wire mounted on said supports and providing a pair of parallel strands parallel to the longer edges of said member and a single marker slidably mounted on each strand and movable over the surface the entire distance between the supports.

BENJAMIN SPINELLI.